United States Patent [19]

Potts et al.

[11] Patent Number: 5,332,893
[45] Date of Patent: Jul. 26, 1994

[54] IMAGING SYSTEM AND DEVICE HAVING A SIMPLIFIED ELECTRODE DESIGN

[75] Inventors: John E. Potts, Woodbury; Owen L. Nelson, St. Paul, both of Minn.; Naoum Araj, Montreal, Canada

[73] Assignee: Minnesota Mining and Manufacturing Company, St. Paul, Minn.

[21] Appl. No.: 918,660

[22] Filed: Jul. 22, 1992

[51] Int. Cl.$^5$ ............................................. H01J 40/14
[52] U.S. Cl. ................................. 250/208.1; 250/582
[58] Field of Search ......... 250/213 R, 208.1, 234–236, 250/370.01, 370.08, 370.09, 327.2 L, 327.2 R, 326, 315.3; 378/62; 346/160

[56] References Cited

U.S. PATENT DOCUMENTS

| | | | |
|---|---|---|---|
| 3,611,074 | 10/1971 | Weichardt | 250/326 |
| 4,085,327 | 4/1976 | Swank et al. | 250/327.2 L |
| 4,176,275 | 11/1979 | Korn et al. | 250/370.08 |
| 4,247,874 | 1/1981 | Kos et al. | 358/213.11 |
| 4,268,750 | 5/1981 | Cowart | 250/315.1 |
| 4,446,365 | 5/1984 | Ong et al. | 250/213 R |
| 4,521,808 | 6/1985 | Ong et al. | 358/111 |
| 4,539,591 | 9/1985 | Zermeno et al. | 358/335 |
| 4,554,453 | 11/1985 | Feigt et al. | 250/327.2 |
| 4,597,017 | 6/1986 | Johnson et al. | 358/294 |
| 4,604,634 | 8/1986 | Feigt et al. | 346/160 |
| 4,663,526 | 5/1987 | Kamieniecki | 250/370.09 |
| 4,763,002 | 8/1988 | Zermeno et al. | 250/370.01 |
| 4,770,483 | 9/1988 | Ridgway | 385/2 |
| 4,778,985 | 10/1988 | Modisette et al. | 250/213 R |
| 4,819,038 | 4/1989 | Alt | 324/158 T |
| 4,839,511 | 6/1989 | Thompson et al. | 250/211 R |
| 4,857,723 | 8/1989 | Modisette | 250/213 |
| 4,873,436 | 10/1989 | Kamieniecki et al. | 250/370.01 |
| 4,961,209 | 10/1990 | Rowlands et al. | 378/29 |
| 5,005,195 | 4/1991 | Lanza et al. | 378/62 |
| 5,126,552 | 6/1992 | Hayes, Jr. | 250/208.4 |
| 5,168,160 | 12/1992 | Jeromin et al. | 250/327.2 R |
| 5,196,702 | 3/1993 | Tsuji et al. | 250/327.2 L |

FOREIGN PATENT DOCUMENTS

0292140A3 11/1988 European Pat. Off. .

OTHER PUBLICATIONS

Rowlands et al., "X-ray imaging using amorphous selenium: A photoinduced discharge readout method for digital mammography," Med. Phys 18(3), May/Jun. 1991 421-431.

Primary Examiner—David C. Nelms
Attorney, Agent, or Firm—Gary L. Griswold; Walter N. Kirn; William D. Bauer

[57] ABSTRACT

A simplified layered imaging stack capable of bearing a latent photostatic image comprising only a single segmented electrode on one side of the stack, rather than plate electrodes on each side of the stack. Appropriate sizing of the segmented electrodes enables individual electrodes to serve at different times as either the ground reference formerly provided by the electrode on the other side of the stack, or the collector of charge carriers representing the latent photostatic image. The imaging stack may be used with a variety of types of imaging systems, and in flat or cylindrical configurations.

24 Claims, 6 Drawing Sheets

IMAGING SYSTEM AND DEVICE HAVING A SIMPLIFIED ELECTRODE DESIGN

TECHNICAL FIELD

This invention relates to systems for producing images, and especially those systems which use photoconductive materials to absorb radiation to create a latent image, followed by a selective detection of the latent image in the photoconductive material.

BACKGROUND

One type of imaging system employs photoconductive materials to absorb incident radiation representative of an image of an object. Suitable photoconductive materials will absorb the radiation and produce electron-hole pairs (charge carriers) which may be separated from each other by an electric field applied across the photoconductor, creating a latent image at the surface of the photoconductor (which is typically a thin planar layer). A narrow beam of scanning radiation substantially completes discharge of the photoconductor, by creating motion of a second set of charge carriers. The distribution of these second charge carriers in the plane of the photoconductor is affected by the distribution of the first charge carriers, i.e., by the latent image. The motion of the second charge carriers is detected and digitized in an appropriate circuit, and thus the latent image is captured in digital form.

In one specific embodiment, the photoconductor is part of a multilayer structure comprising two electrodes, between which are the photoconductive layer and an insulating layer. A high voltage power supply maintains electric fields in the structure during exposures to the incident radiation and the scanning radiation (although not necessarily the same field strength is present during each exposure). An example of this type of system is taught in U.S. Pat. No. 4,176,275 (Korn et al.).

A second and closely related approach, known as the air-gap photoinduced discharge (PID) method, employs air as the insulating layer, and requires that a uniform separation be maintained between the two electrodes, typically by high-precision mechanical or piezoelectric devices. A corona charges the surface of the photoconductor prior to exposure to radiation, producing an electric field in the material. Thus, the incident radiation partially discharges the surface to produce a latent image, and the read-out signal is induced by the charge motion under the influence of the residual electric field in response to the scanning radiation. Such a system is described in Rowlands et al., Med. Phys. 18(3), May/June 1991 at 421–431.

Various methods for scanning the latent image exist. For example, the method of U.S. Pat. No. 4,961,209 (Rowlands et al.) employs a transparent sensor electrode positioned over the photoconductive layer, and a pulsed laser which scans the photoconductive layer through the transparent sensor electrode. By moving the photoconductive layer and the transparent sensor relative to each other, so that the direction of relative motion is transverse to the direction in which the laser scans, a pixel-by-pixel discharge of the charge carriers is created.

Practical applications of these systems have encountered several problems.

First, fabrication of the imaging stack (i.e., the electrodes, insulator, photoconductive material, etc.) requires applying layers of material to each other, typically by constructing two sub-stacks, and then applying them to each other. These procedures can introduce non-uniformities into the thicknesses of the imaging stack.

Second, reflection and scattering of incident radiation can occur at the interfaces between layers, reducing image quality. This problem, and the attempted solutions to it, are compounded by the non-uniformities in thicknesses.

Third, discharge breakdown of the insulative material is possible, especially in the air-gap PID approach, leading to avalanche currents in the system.

Fourth, as the areal size of the imaging stack increases, a requirement of practical applications such as chest x-ray imaging, the capacitance created by the electrode plates increases, reducing the effectiveness of the system. One approach to this last problem is that of U.S. Pat. No. 4,857,723 (Modisette). This approach avoids, rather than solves, the capacitance issue, by employing many small detectors ganged together.

DISCLOSURE OF THE INVENTION

One aspect of the invention is a system for producing an image created by radiation incident upon an imaging device, and a second aspect of the invention is the imaging device itself. The imaging device comprises, in this order, a photoconductive insulative layer having a certain thickness, an electrically blocking layer, and a single conductive layer which consists essentially of a segmented array of at least one group of elongated, striped, conductive electrodes lying in a first direction. The imaging device is used with a means for charging a first surface of the photoconductive insulative layer such that first charge carriers created in the imaging device by first incident radiation are subsequently separated to create a first current, resulting in the formation of a latent electrostatic image near the charged first surface of the photoconductive insulative layer. Then, a scanner may, in a first time-ordered pattern, utilize a second incident radiation to initiate a second current, comprising second charge carriers, within the imaging device. Detection electronics is connected to, and sensitive to motion of the second charge carriers in, each electrode.

In operation, the scanner scans the array in a second direction, and each conductive electrode of a group is addressed in a second, time-ordered pattern such that only one electrode in a group is monitored at one time for motion of the charge carriers, while adjacent electrodes of that group are held at a voltage level representing a virtual ground as measured relative to the monitored electrode. The detection electronics interprets a coincidence of the first and second patterns as a pixel of the image created by the radiation.

The imaging device has a simpler construction than conventional devices, and despite the absence of a second plate electrode, it is capable of producing a signal representing an image that is detectable over the inherent noise in the system.

DETAILED DESCRIPTION

Figure 1:
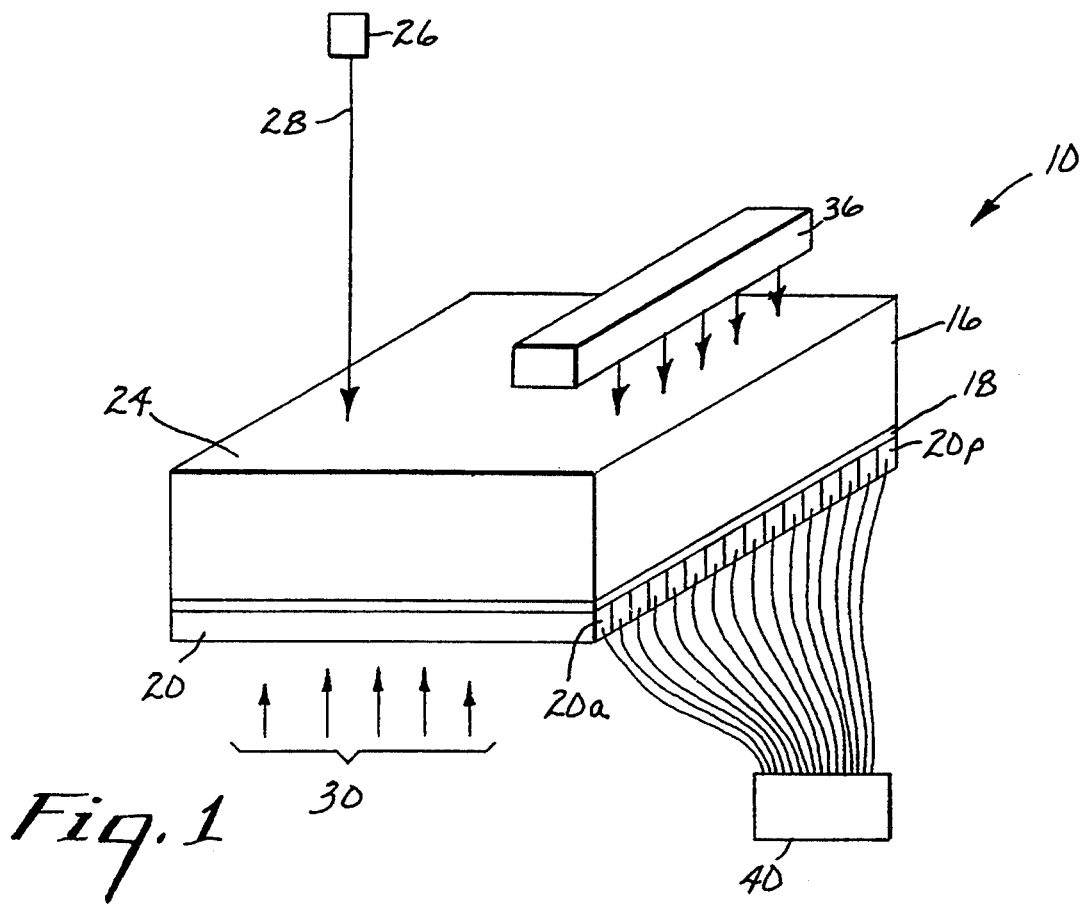
FIG. 1 is a schematic representation of one embodiment of the invention.

The basic construction of the invention is illustrated schematically in FIG. 1. The imaging device 10 comprises a layered stack: a photoconductive insulative layer 16, an electrically blocking layer 18, and a conductive layer 20, in that order (top to bottom as shown). The conductive layer 20 comprises a segmented array of conductive electrodes, 20a–20p in the sixteen channel embodiment shown (other numbers of channels are possible).

Although not shown for clarity, in an actual construction a support for the layered stack, such as a supporting transparent substrate and/or a mechanical frame of some type, would generally be used. The layered stack may be built up on the substrate from individual components, and then placed in the frame. However, with a suitable choice of materials, the layered stack may not require a substrate or a mechanical frame, and thus the invention is not so limited as to require their use.

Also not shown is an optional insulative protective layer that may be used on the side of the photoconductive insulative layer 16 opposite the electrically blocking layer 18; i.e., in the order given above the insulative protective layer is before the photoconductive insulative layer 16. The insulative protective layer may be, for example, cellulose triacetate or a polymeric material. The function of the insulative protective layer is to protect the imaging stack from damage, especially by protecting (passivating) the photoconductive insulative layer 16. This reduces corrosion sites that can cause non-uniform charge distributions on surface of the imaging stack upon charging by a corona (described below).

Many materials are suitable for each of the layers of the stack, subject to considerations of electrical properties and transparency discussed below. Generally, the substrate, if used, may be any material providing mechanical support, dimensional stability, and low electrical conductivity. For example, glass having a thickness of approximately 2 to 4 mm is a suitable substrate upon which the segmented array of the conductive layer may be created by depositing a planar conductive sheet and then etching away undesired material.

The preferred material for the photoconductive insulative layer is amorphous selenium, which may be incorporated into the layered stack in a conventional manner. Lead oxide, cadmium sulfide, and mercurous iodide, among other materials, are suitable, as are organic photoconductors. In general, the photoconductive insulative layer will have low conductivity in the absence of radiation so that an electric field may be maintained across it for a sufficient period of time, such as a resistivity of about $10^9$ ohm-cm or greater.

The thickness of the photoconductive insulative layer should be sufficient to allow it to absorb about 50% or more of the flux of incident radiation (described below). For amorphous selenium and diagnostic x-ray radiation, for example, this thickness is approximately 250–550 micrometers.

Charge source 36 creates a charge distribution on the upper surface 24 of the imaging stack 10. For example, a scorotron or a corotron may create the charge distribution by corona discharge.

The incident radiation leaves a latent image in the imaging stack by creating charge carriers within the photoconductive insulative layer 16. The charge carriers separate and migrate under the influence of the electric field created by the applied charge distribution. This creates a first current within the imaging device 10, reducing the field in an image-wise pattern at the surface 24.

The image of interest is in the form of a pattern of incident radiation 30, which is incident upon the imaging stack from either side. In FIG. 1, the incident radiation 30 is incident from the direction of the array of electrodes, but this is illustrative only. In this embodiment, the array of electrodes and the electrically blocking layer 18 must be semitransparent at the wavelength of the incident radiation 30. A preferred embodiment of the invention is designed for use with incident radiation in the form of x-rays (wavelength $10^{-7}$ to $10^{-10}$ cm), for which thin metallic (e.g., aluminum) layers are sufficiently semitransparent.

In the readout phase of operation, scanner 26, in a first time-ordered pattern, utilizes scanning radiation 28 to energize the imaging device 10 to produce a second current, comprising mobile charge carriers, within the imaging device 10.

Scanning radiation 28 may have a wavelength substantially similar to that of the incident radiation, or a substantially different wavelength. Scanning radiation 28 may be ultraviolet, visible, or infrared radiation.

Generally, the first time-ordered pattern will ensure that the entire surface of the layered stack holding the latent image is scanned; a preferred pattern scans the entire surface of the layered stack, since until the scan is performed the location of the image on the surface is not known. For most efficient operation at highest resolution, any point on the surface is scanned only once, and no points are missed. A preferred pattern is a series of parallel lines in which the scanning proceeds in the same direction in each line, allowing time for the scanner to return to the other side of the stack between lines. Such a pattern can be oriented at angles up to 45° to the direction of the electrodes, but preferably is oriented perpendicular to the direction of the electrodes.

Scanning radiation 28 is absorbed in the photoconductive insulative layer 16. Generally, the scanner is a continuous laser and the scanning radiation is in the visible wavelength range. The wavelength is determined by the energy required to excite charge carriers in the photoconductive layer. For an amorphous selenium photoconductive insulative layer, a blue-green laser is appropriate.

Figure 2:
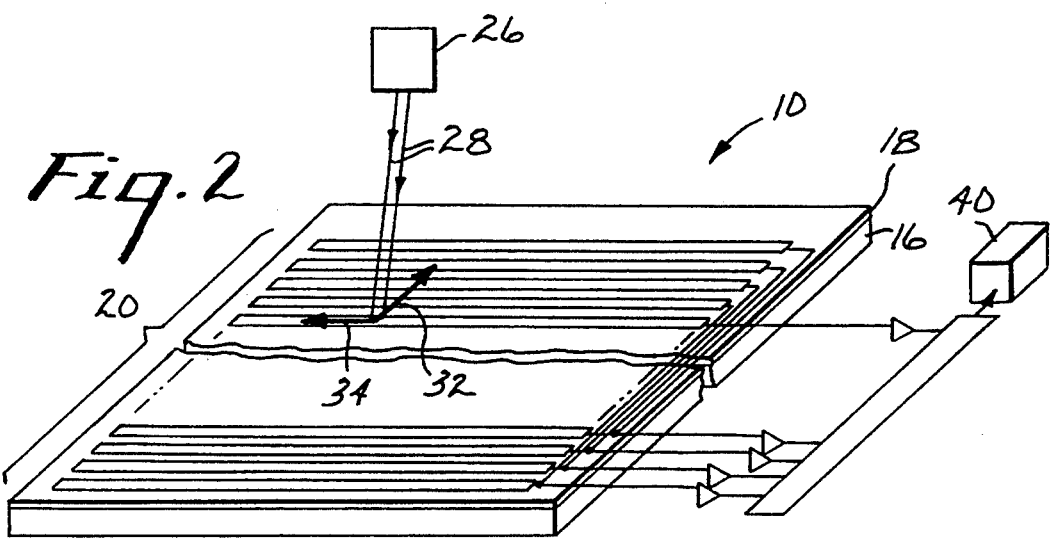
FIG. 2 is a schematic representation of another embodiment of the invention.

In the embodiment shown in FIG. 1, the scanning radiation 28 energizes the imaging stack 10 from above. This is illustrative only, as the scanning radiation 28 could also energize the imaging stack 10 by passing through the conductive layer 20 and the electrically blocking layer 18 prior to absorption, as shown in FIG. 2. In this case, the conductive layer must be semitransparent at the wavelength of the scanning radiation (e.g., the wavelengths on the order of several hundred nanometers that are typical of visible lasers). Generally, the conductive layer will be semitransparent due to a very small thickness (e.g., gold), or a non-metallic construction at a greater thickness (e.g., indium tin oxide 0.1 to 0.5 microns thick). The electrically blocking layer 18 must also be semitransparent and is typically 0.01 to 0.1 microns thick. Also, if a substrate is present and radiation passes through it, it must be transparent at the wavelengths involved.

As indicated in FIG. 2, the array of electrodes 20 is a plurality of elongated parallel stripes. In x-ray radiation applications, a stripe width of 10–200 microns is preferred. When the array is to act as if it were a single continuous conductive plate, i.e., during corona charging, the individual stripes are simply connected together in any convenient manner (not shown in FIG. 2).

The direction of the electrodes 20 must be substantially different from the direction of the scan performed by scanner 26, i.e., scanner 26 scans the array in a "vertical" direction, indicated by arrow 32, and the electrodes lie in a "horizontal" direction indicated by arrow 34. Thus, as shown, the directions 32 and 34 are perpendicular to each other, but other substantially different directions are possible with appropriate modifications to detection electronics 40.

The latent image is captured by detection electronics 40, which is attached to the conductive electrodes 20, and is sensitive to motion of the charge carriers set in motion by the scanning radiation 28. Approximately 10–50 microseconds may be required for the charge carriers to reach the electrodes. For each electrode, the change in induced charge is detected and amplified to produce a signal indicative of the capture of that part of the latent image.

The sensitivity of the detection electronics 40 is timed to the members of the array 20 in a second, time-ordered pattern. A single electrode is made more sensitive than adjacent electrodes by holding the adjacent electrodes at "effective" or "virtual" ground level (not necessarily absolute ground level) relative to the single electrode between them, and by triggering an integrator circuit to begin collecting charge on that electrode. For example, given the parallel lines of the first time-ordered pattern mentioned above, the second time-ordered pattern would follow in the "direction" of sensitivity, i.e., the location of the most sensitive electrode as a function of time would appear to move repeatedly across the layered stack. This apparent motion would be synchronized with the scanning pattern, including pauses at each end of the stack to allow the scanner to move to the start of the next line. Thus, by appropriate coordination of the first and second time-ordered patterns, the detection electronics 40 interprets a coincidence of the first and second patterns as a pixel of the image produced by incident radiation 30.

FIG. 2 shows an example of how the array of striped electrodes could be attached to the detection electronics 40, although other techniques are possible. For convenience of illustration, only nine electrodes are shown in FIG. 2: the first through fourth, inclusive; the Nth; and the N+1st to N+4th, inclusive. Beginning with the first electrode, every Nth next electrode stripe is electrically tied together, i.e., the first and the N+1st are tied together, as are the second and the N+2nd electrodes, the third and the N+3rd electrode, etc. Thus, N channels may be created from M electrodes, where M is greater than N, but only N circuits are required, although of course up to M circuits could be used.

Although not shown in FIG. 2 for clarity, the array of electrodes also preferably contains a start-of-scan and an end-of-scan electrode at opposite ends of the array, each of which may have a dedicated circuit if desired. This allows the electronics to identify positively if the scanning radiation is at either of these positions in the array, and thus synchronize the detection circuitry for each scanned line.

Figure 3:
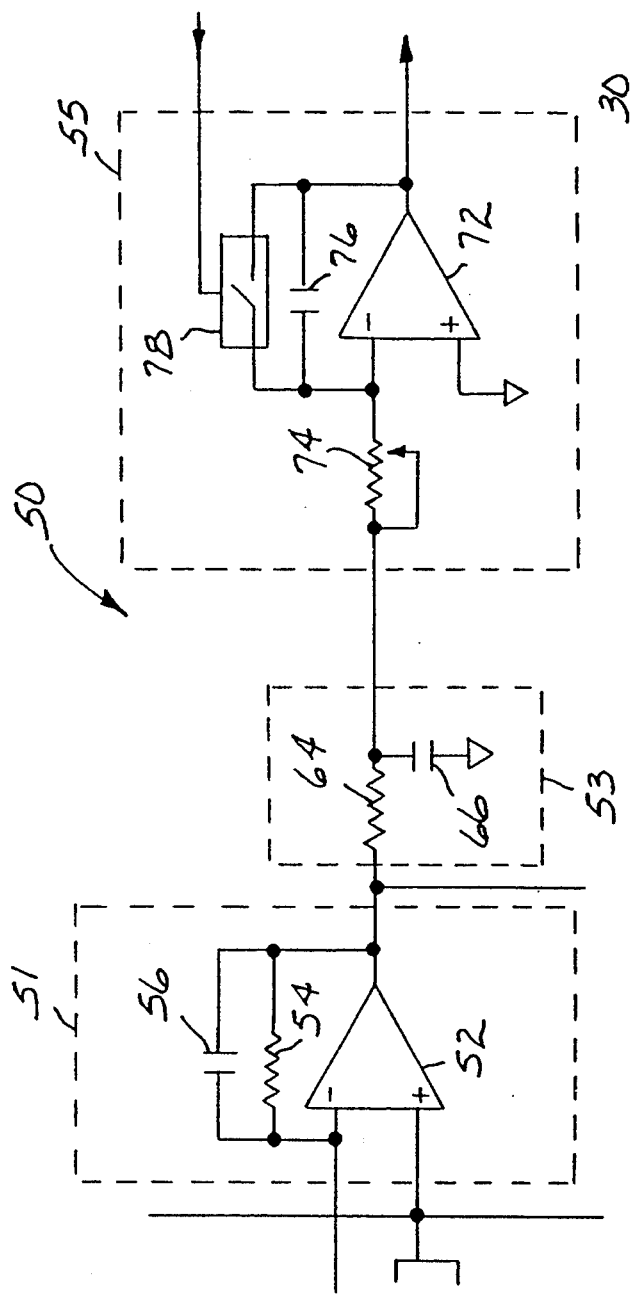
FIG. 3 is an electrical schematic diagram of a preferred amplifier for use with the invention.

FIG. 3 shows an electrical diagram of the preferred circuit 50 for each of the N channels. The circuit 50 is comprised of three combinations 51, 53, and 55 of circuit elements. The first combination 51 includes an operational amplifier 52, which can be Burr-Brown OPA637, and a feedback resistor 54, which can be $1 \times 10^7$ ohms, connected in parallel with a compensation capacitor 56, which can be 70 femtofarads. This combination of circuit elements serves as a transimpedance amplifier which results in a conversion of charge pulses into a corresponding voltage pulse.

The second combination 53 of circuit elements acts as a low-pass filter and includes a resistor 64 and a capacitor 66. This low-pass filter should be designed so that the response rolls off at a desired frequency. This combination of elements need not be included in the circuit 50.

The third combination 55 of circuit elements includes an operational amplifier 72, such as Burr-Brown OPA627, a capacitor 76, such as 0.001 microfarad, a variable input resistor 74, having a resistance of 0–20 kilo-ohms, and a remotely-controlled switch 78, such as Siliconix VN0300M N-channel enhancement FET. This combination of circuit elements functions as a switched integrator controlled by an external signal. The resistor 74 is adjusted to give the desired integrator response in volts per coulomb. The voltage output of the integrator can be sampled by an analog multiplexer that is controlled by an external signal.

Conventional timing circuitry may then be employed by detection electronics 40 (shown in FIG. 2) to process the N-channel input signal into M lines of vertical resolution. In the horizontal direction, the resolution is determined by the displacement of the path of scanning radiation 28, which is easily controlled by the scanner 26. In a preferred embodiment N=32 and the spacing between electrode center lines is 170 microns (about 5.9 electrodes per millimeter). The lateral displacement of the scanning radiation should then be about 5.9 lines/mm to produce about 34.6 of the preferred square pixels per square millimeter of image.

Preferably, each electrode has a width equal to 10–90% of the spacing between electrode center lines, and 50–80% is most preferred. Values above this range lead to increased capacitance between electrodes, and values below this range tend to increase capacitance between electrodes, and values below this range tend to increase electrode resistance and difficulty in fabrication.

Surprisingly, there is essentially no loss of available charge collected by each electrode even though the electrodes do not cover the entire surface area of the layered stack. This is because lateral migration of the charge carriers created in the areas between the electrodes, under the influence of the applied electric field, allows the entire image to be recovered, despite the use of segmented electrodes.

Figure 4:
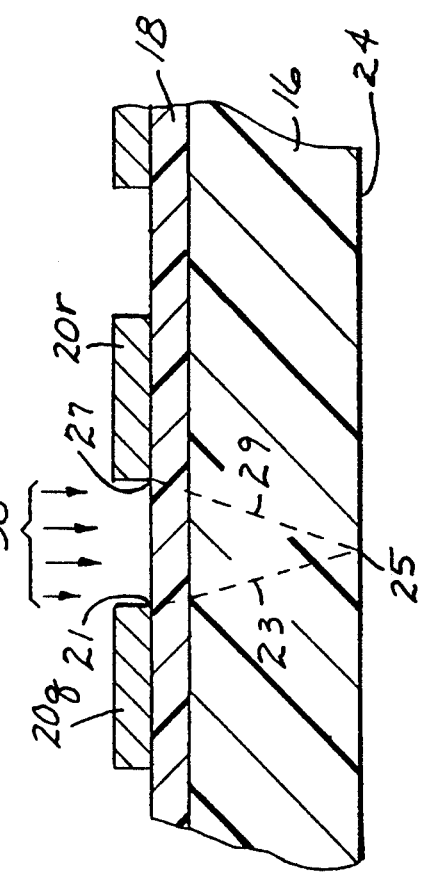
FIG. 4 is a cross-section of a portion of the embodiment of FIG. 2.

FIG. 4 shows a cross-section of a portion of the system shown in FIG. 1. Electrodes 20q and 20r are representative members of the array of electrodes forming the conductive layer 20. There is a gap between electrodes 20q and 20r, and thus it appears that a portion of the image 30 would not be captured by the system. However, charge carriers collected at the edge of electrode 20q, designated as point 21, may have migrated along path 23 from the interface 24, originating in the vicinity of point 25. Similarly, charge carriers collected at the edge of electrode 20r, designated as point 27, may have migrated along path 29 from the vicinity of point 25. Thus, charge carriers are collected from the entire extent of interface 24, and all charge carriers created at the interface 24 are collected by electrodes 20q and 20r. A similar result occurs for all pairs of electrodes in the array.

Of course, the applied field strength, the thickness of the photoconductive insulative layer, and the spacing between electrodes, must all be chosen such that the trajectories and velocities (toward the first conductive layer as well as transverse to that direction) of the charge carriers are optimized for complete recovery of the charge carriers at the interface.

It is possible, although not as preferred, for a single electrode to support multiple lines of resolution, thus more than one pixel of the electrostatic image in the vertical direction will be produced by a single stripe of the array. This can be accomplished by using multiple scans of an intensity-modulated laser spot having a size smaller than the width of a stripe, and scanning at higher rates than the preferred embodiment. Each scan will involve modulation of the intensity of the smaller spot over a different subportion of the stripe.

Also, the first and second time-ordered sequences may be re-synchronized periodically (e.g., at least once per scan) during each scanned line. The scanned image may be processed in many ways. Typically, after scanning, the electronics processes the image signal through analog/digital circuitry. Each pixel of image is represented as a (preferably at least 12-bit) number indicating the intensity of the image. A single line of the image may be handled as a single block of data. Preferably, a "windowing" technique produces an 8-bit value from the 12-bit value to enhance the contrast of the image prior to display on a monitor or hard copy device.

Figure 9:
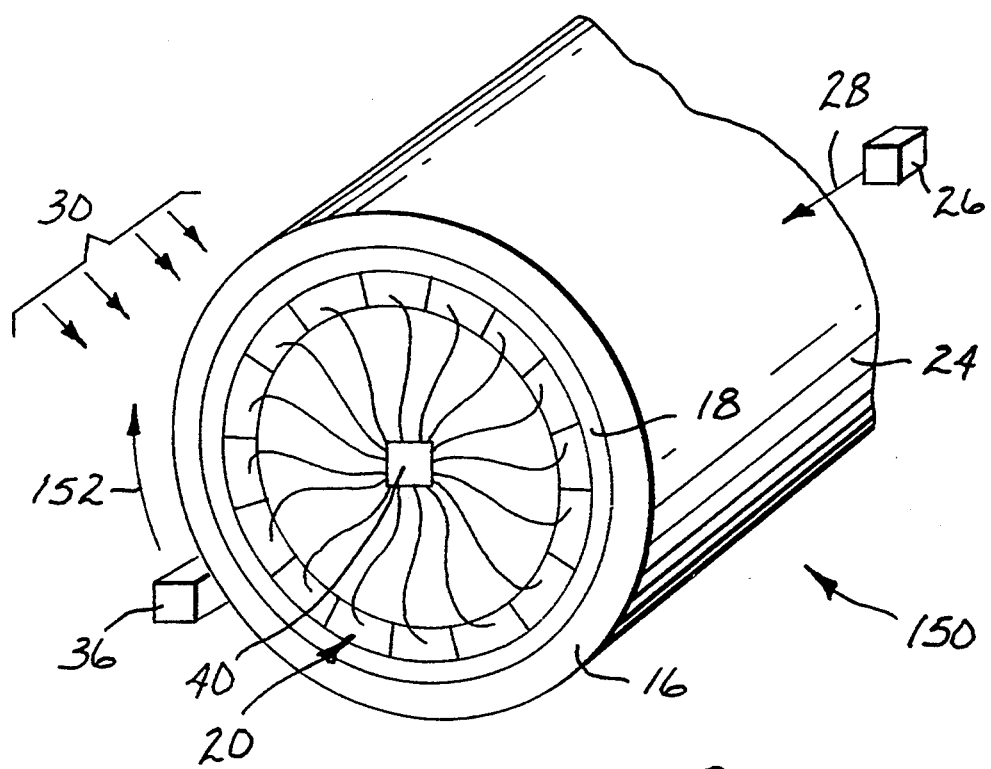
FIG. 9 is a schematic representation of a cylindrical embodiment of the invention.

The imaging device of the present invention may also be in the shape of a generally cylindrical drum 150, as shown in FIG. 9. Drum 150 is comprised of the photoconductive insulative layer 16, the electrically blocking layer 18, and the conductive layer 20 comprised of segmented electrodes 20a–20p. Detection electronics 40 is located within drum 150. Surface 24 of photoconductive insulative layer 16 is corona charged by the charge source 36. Incident radiation 30 is directed toward drum 150. In the readout phase of operation, scanner 26 utilizes scanning radiation 28 to raster across surface 24 of drum 150 as the drum rotates about a central axis in the direction of arrow 152.

The use of a scanned point beam of light and the collection of induced current using only a single conductive layer having segmented, narrow electrodes located adjacent to the photoconductive insulative layer, provides several independent advantages over known systems.

First, because the imaging stack is able to collect the signal by using only a single, segmented electrode, a second electrode located adjacent an additional insulative layer is not necessary, and thus the invention offers greatly simplified construction. This advantage results from the segmentation of the electrode and use of a plurality of amplifiers.

Second, segmentation of the electrodes and use of a plurality of amplifiers allows for the entire image to be formed in less time. Using multiple amplifiers, a single amplifier can wait for all the charges present on the associated electrode to reach a single electrode while the scanning radiation continues on to another region of the image. Use of a point source of scanning radiation permits several stripes to be connected together on a single amplifier, and does not require that all amplifiers operate identically in time.

Third, each amplifier is loaded by the capacitance of only M/N stripes rather than the capacitance of the entire imaging stack. Because amplifier noise increases with the size of the input capacitance, segmentation of the electrode reduces the magnitude of electronic noise associated with each amplifier.

Each of these advantages standing alone would result from the invention, but the combination of all of them together is a significant advantage of the invention over the prior art.

EXAMPLE 1

Figure 5:
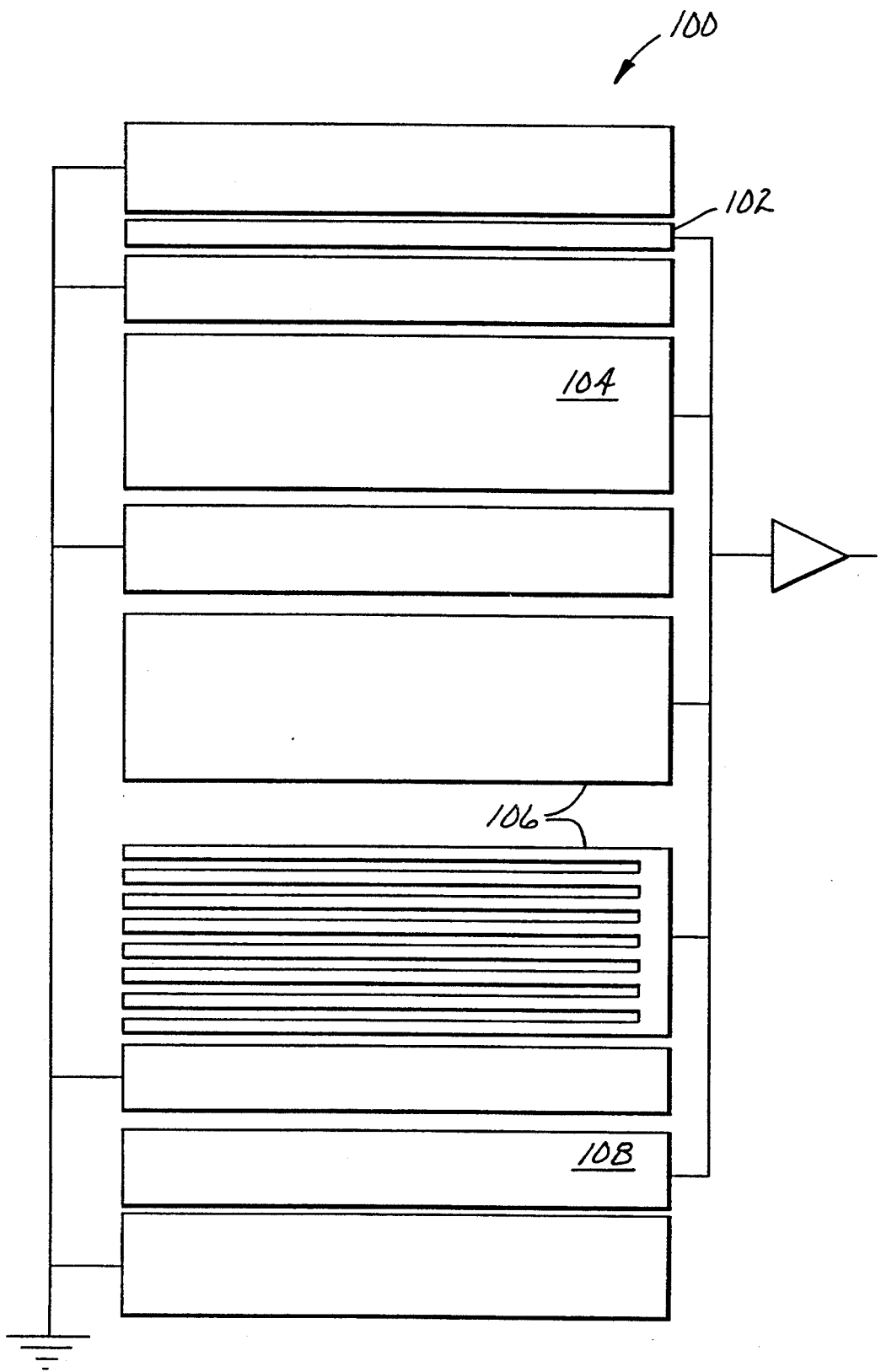
FIG. 5 is a schematic diagram of electrode stripes in accordance with the invention.

A detector was constructed according to these teachings, but consisting of only four interconnected electrode stripes, each surrounded by wide electrodes attached to an electrical ground, as shown in FIG. 5. The detector 100 included an active electrode stripe 102 which was 80 microns wide, an active electrode stripe 104 which was 780 microns wide, and an active electrode stripe 108 which was 380 microns wide, as shown in FIG. 5. Each of the active electrode stripes 102, 104, and 108 were separated from their neighboring ground pads by gaps of 20 microns. The detector 100 also included a fourth active electrode stripe 106 which was comprised of an electrode stripe 780 microns wide, adjacent an open space 300 microns wide, and eight interconnected stripes, each separated from its neighbors by a gap of 20 microns, thereby forming, for the purposes of this example, another single 780 micron wide electrode separated from its adjacent ground pads by 20 microns on each side. This pattern was formed in thin (6000 angstrom) aluminum on a glass plate. A blocking layer was then formed over the stripes, followed by a layer of amorphous selenium about 300 microns thick. This detector construction was then mounted in a metal-walled cassette which provided electrical connections and light control to protect the latent image.

Positive charge was applied to the upper surface of the selenium by passing the mounted plated beneath a corotron operated at 8000 V, and with the coratron wire located about 2.5 cm (about one inch) above the surface of the plate. The distribution of surface charge across the selenium plate was non-uniform due to the presence of the metal cassette walls. The average surface voltage over the region of interest here was approximately 600 volts creating an initial electric field across the selenium layer of approximately 2 volts per micron. Variations in the surface voltage of ±150 volts led to errors in the signals measured here.

For readout, the interconnected electrodes were connected to an amplifier circuit which includes a current-to-voltage stage and a gated integrator stage. Digital control circuits provided timed signals for gating the integrator stage, connecting the integrator to the analog-to-digital converter circuit and synchronizing the integrator gating sequence to the position of the laser spot as it scanned across the detector in a direction perpendicular to the stripes.

The scanning spot was formed by optics to an essentially gaussian intensity profile of about 100 micron width from an argon-ion laser beam of wavelength 488 nanometers, translated past the stripes at a rate of approximately 45 cm/second by deflection by a galvanometer mirror, and modulated by an aperture and accoustooptic element. The detector was translated perpendicular to the scan direction by a motor-driven stage moving at a velocity sufficient to space successive scans at 85 micron separations. Control circuitry synchronized stage motion and laser gate opening with data collection signals which were used to activate the amplifier integrator gate and collect digital pixel value values from the analog-to-digita convertor.

Figure 6:
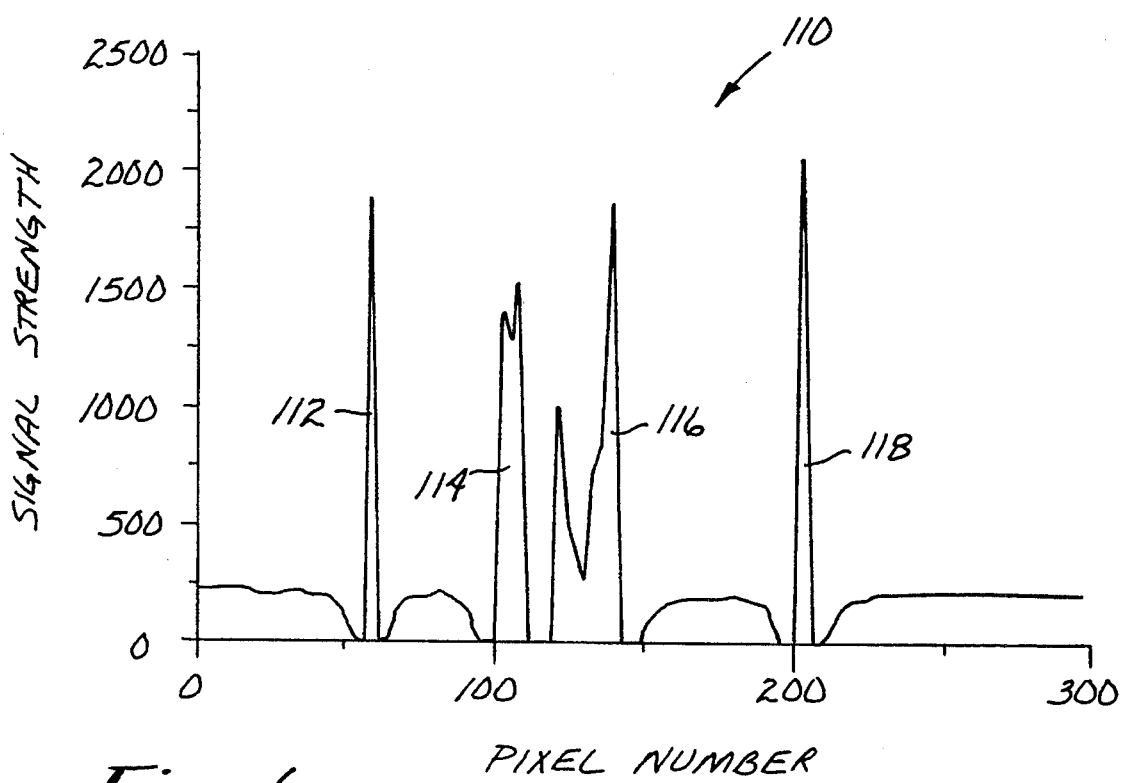
FIG. 6 is a graph showing signal strength as a function of pixel number for a detector in accordance with the invention.

The graph 110 of FIG. 6 shows the resulting signals as a function of position perpendicular to the stripes. The signals for the electrode stripes 102, 104, 106, and 108 are represented by peaks 112, 114, 116, and 118, respectively. The graph 110 shows the enhancement of the signal as the laser passes over the edge of a stripe. The shape of peak 114 (corresponding to electrode stripe 104) indicates that the signal strength diminishes as the laser enters the central regions of the stripe.

The shape of peak 116 (corresponding to electrode stripe 106) demonstrates that the segmented-but-interconnected electrode portion of stripe 106 exhibits the same behavior as a solid electrode having the same width. Therefore, a narrow stripe alone does not produce an enhancement of the signal; what is necessary is that the narrow stripe be read out against adjacent electrodes which are held at a fixed potential, as is the case with electrode stripe 102. It is believed that the magnitude of the dip in the middle of peak 116 is due to the fact that electrode stripe 106 has a large separation (300 microns) between its wide (780 micron) electrode stripe and its eight interconnected stripes.

The signal from each stripe reflects the information from the one or more 85-micron pixels defined by the laser spot over that stripe. For intercomparison, therefore, it is necessary to integrate the signals in FIG. 6, and then normalize these integrated signals to an 85-micron pixel width by multiplying the integrated signal strength by 85/W, where W is the stripe width in microns. The results of this analysis are shown in the graph 120 in FIG. 7, where the (normalized) signal strength is plotted against the stripe width. The signal strength for the active electrode stripes 102, 104, 106, and 108 are represented by the circles 122, 124, 126, and 128, respectively.

The graph 120 shows that signal strength increases by more than 50% from the circle 124 to the circle 122, which correspond to the active electrode stripes 104 and 102 having widths of 780 microns and 80 microns, respectively. Thus, the signal strength increases as the width of the electrode stripe decreases.

Figure 7:
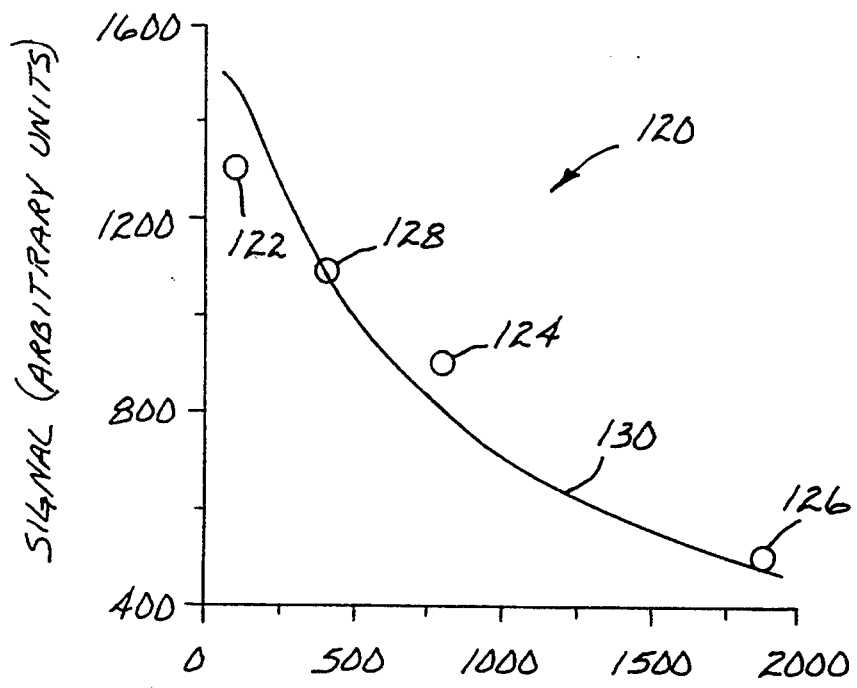
FIG. 7 is a graph showing signal strength as a function of electrode stripe width for a detector in accordance with the invention.

Within the data accuracies of this experiment, the enhancement is in agreement with our calculations for a detector having these dimensions (shown as line 130 in FIG. 7).

EXAMPLE 2

A detector was constructed consisting of multiple electrode stripes each 100 microns wide separated from each other by 70 micron gaps. This stripe pattern was formed in 8-micron-thick nickel-coated copper on a polyimide sheet laminated to a thick glass plate. A blocking layer was then formed over the stripes, followed by a layer of amorphous selenium about 425 microns thick. This detector construction was then mounted in a holder which provided electrical connections and light control. Each of the electrodes was attached to its own transimpedance preamplifier set to produce 10 volts per microamp of charge flow.

A corotron was used to deposit positive charge onto the upper surface of the selenium layer. This produced a surface voltage on the selenium layer of approximately 500 volts, thereby creating an initial electric field across the selenium of approximately 1.2 volts per micron.

For readout, electronics were connected to the sample holder to provide for attachment of each of the electrodes to a current-to-voltage transimpedance amplifier. The outputs of several such amplifier stages were monitored on a digital oscilloscope as the laser spot was scanned across the detector in a direction perpendicular to the stripes.

The scanning spot was formed by optics to an essentially gaussian intensity profile of 100 micron width from an argon-ion laser beam of wavelength 442 nanometers, and translated past the stripes at a rate of approximately 28 meters/second by deflection by a holographic scanner.

Figure 8:
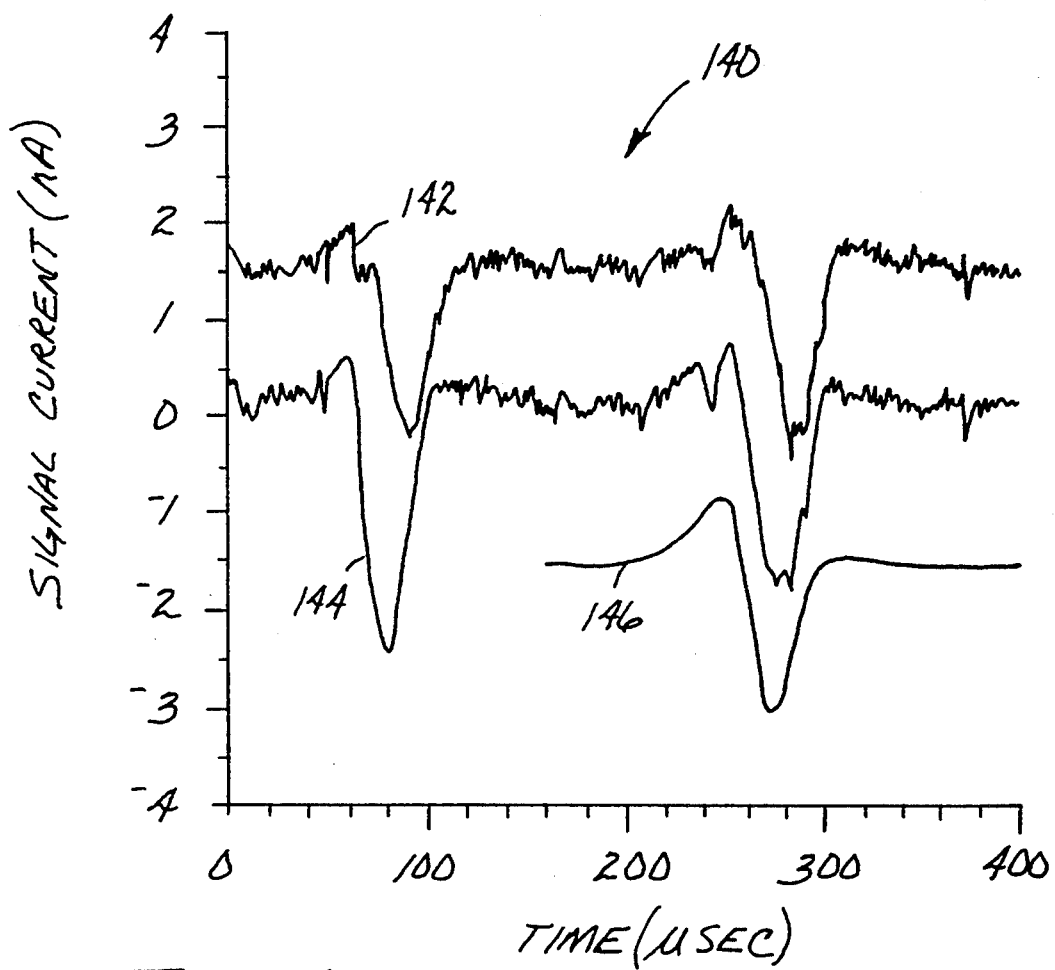
FIG. 8 is a graph showing signal current as a function of time for a detector in accordance with the invention.

A graph 140 showing the resulting current signals as a function of position perpendicular to the stripes is shown in FIG. 8. The two upper curves 142 and 144 are the signals measured simultaneously from two adjacent stripes. For the sake of clarity, the three curves have been displaced vertically from each other by equal amounts. The laser beam passes over Stripe #12 before Stripe #13, so there is a delay between the two signals reflecting the time required for the beam to pass between the stripes. This time is given by the distance divided by the velocity, or 170 $\mu$m/28 m/s, which is equal to 6 $\mu$s. The data demonstrate that induced charge signals of considerable magnitude can be obtained by scanning the charged plate in this manner.

The line 146 in FIG. 8 represents our modelling of the signal waveform, and shows excellent agreement with the measured result. The simulated waveform has been passed through a 50 kHz low-pass filter to simulate the passage of the raw signal through the amplifier, which has the effect of slightly rounding the peaks. The positive-going departures of the signal at the beginning and ending of the laser-induced negative pulse reflect the passage of charge from the electrode in question to neighboring electrodes as their signal levels rise and fall. Overall, the net change in the charge on any electrode after a full scan must, of course, be zero.

We claim:

1. A system for producing an image created by radiation incident upon an imaging device, comprising:
   (a) an imaging device comprising, in this order, a photoconductive insulative layer having a certain thickness, an electrically blocking layer, and a single conductive layer which consists essentially of a segmented array of at least one group of elongated, striped, conductive electrodes lying in a first direction;

(b) means for charging a first surface of the photoconductive insulative layer such that first charge carriers created in the imaging device by first incident radiation are subsequently separated to create a first current, resulting in the formation of a latent electrostatic image near the charged first surface of the photoconductive insulative layer;

(c) a scanner which, in a first time-ordered pattern, utilizes a second incident radiation to initiate a second current, comprising second charge carriers, within the imaging device; and (d) detection electronics connected to, and sensitive to motion of the second charge carriers in, each electrode;

in which:

(e) the scanner scans the array in a second direction; and (f) each conductive electrode of a group is addressed in a second, time-ordered pattern such that only one electrode in a group is monitored at one time for motion of the charge carriers, while adjacent electrodes of that group are held at a voltage level representing a virtual ground as measured relative to the monitored electrode, and the detection electronics interprets a coincidence of the first and second patterns as a pixel of the image created by the radiation.

2. The system of claim 1 in which the imaging device additionally comprises, in order before the photoconductive insulative layer, an insulative protective layer.

3. The system of claim 1 in which each electrode of the array has a width substantially less than the thickness of the photoconductive insulative layer.

4. The system of claim 1 in which each electrode has a width less than seven times the thickness of the photoconductive layer.

5. The system of claim 1 in which the first and second directions are substantially different from each other.

6. The system of claim 5 in which the first and second directions are substantially perpendicular to each other.

7. The system of claim 1 in which the electrodes of the conductive layer are semitransparent, and the second radiation is incident upon the array of conductive electrodes prior to being incident upon the photoconductive insulative layer.

8. The system of claim 1 in which more than one pixel, as measured in the second direction, is produced in a single electrode, by means of an intensity-modulated laser.

9. The system of claim 1 in which the second radiation is a continuous laser beam.

10. The system of claim 1 in which the first and second radiations have substantially different wavelengths.

11. The system of claim 1 in which the first and second radiations have substantially similar wavelengths.

12. The system of claim 1 in which the first radiation is x-ray radiation and each electrode has a width of between approximately 10 to 200 microns.

13. The system of claim 1 in which the first radiation is one of ultraviolet, visible, and infrared radiations.

14. The system of claim 1 in which the second radiation is one of ultraviolet, visible, and infrared radiations.

15. The system of claim 1 in which the imaging device is substantially a flat plate.

16. The system of claim 1 in which the imaging device is generally cylindrical.

17. An imaging device for use in a system for producing an image created by a first incident radiation, the system including:

(a) means for charging the imaging device;

(b) a scanner which, in a first time-ordered pattern, produces a second radiation incident upon the imaging device; and (c) detection electronics connected to, and sensitive to motion of charge carriers in, an electrode attached to the imaging device;

in which the first incident radiation is incident upon a first surface of a photoconductive insulative layer such that first charge carriers created in the imaging device by first incident radiation are subsequently separated to create a first current, resulting in the formation of a latent electrostatic image near the charged first surface of the photoconductive insulative layer, and the second incident radiation initiates a second current, comprising second charge carriers, within the imaging device;

the imaging device being characterized by comprising, in this order, a photoconductive insulative layer having a certain thickness, an electrically blocking layer, and a single conductive layer which consists essentially of a segmented array of at least one group of elongated, striped, conductive electrodes lying in a first direction;

and further characterized in that when each conductive electrode of a group is addressed by detection electronics in a second, time-ordered pattern, such that the detection electronics addresses one electrode of a group at a time to monitor for motion of charge carriers, while adjacent electrodes of that group are held at a voltage level representing a virtual ground as measured relative to each addressed electrode, then a coincidence of the first and second patterns may be interpreted by the detection electronics as a pixel of the image created by the radiation.

18. The imaging device of claim 17, in which each stripe of the array of electrodes has a width substantially less than the thickness of the photoconductive insulative layer.

19. The imaging device of claim 17 in which each electrode has a width less than seven times the thickness of the photoconductive layer.

20. The imaging device of claim 17 in which the electrodes of the conductive layer are semitransparent, such that radiation may energize the imaging device through the array of conductive electrodes prior to being absorbed in the photoconductive insulative layer.

21. The imaging device of claim 17 in which the imaging stack is capable of producing a latent image produced by x-ray radiation, and each electrode has a width of between approximately 10 to 200 microns.

22. The imaging device of claim 17 in which the imaging stack is capable of producing a latent image produced by ultraviolet, visible or infrared radiation.

23. The imaging device of claim 17 in which the imaging device is substantially a flat plate.

24. The imaging device of claim 17 in which the imaging device is generally cylindrical.

* * * * *